United States Patent Office 3,025,962
Patented Mar. 20, 1962

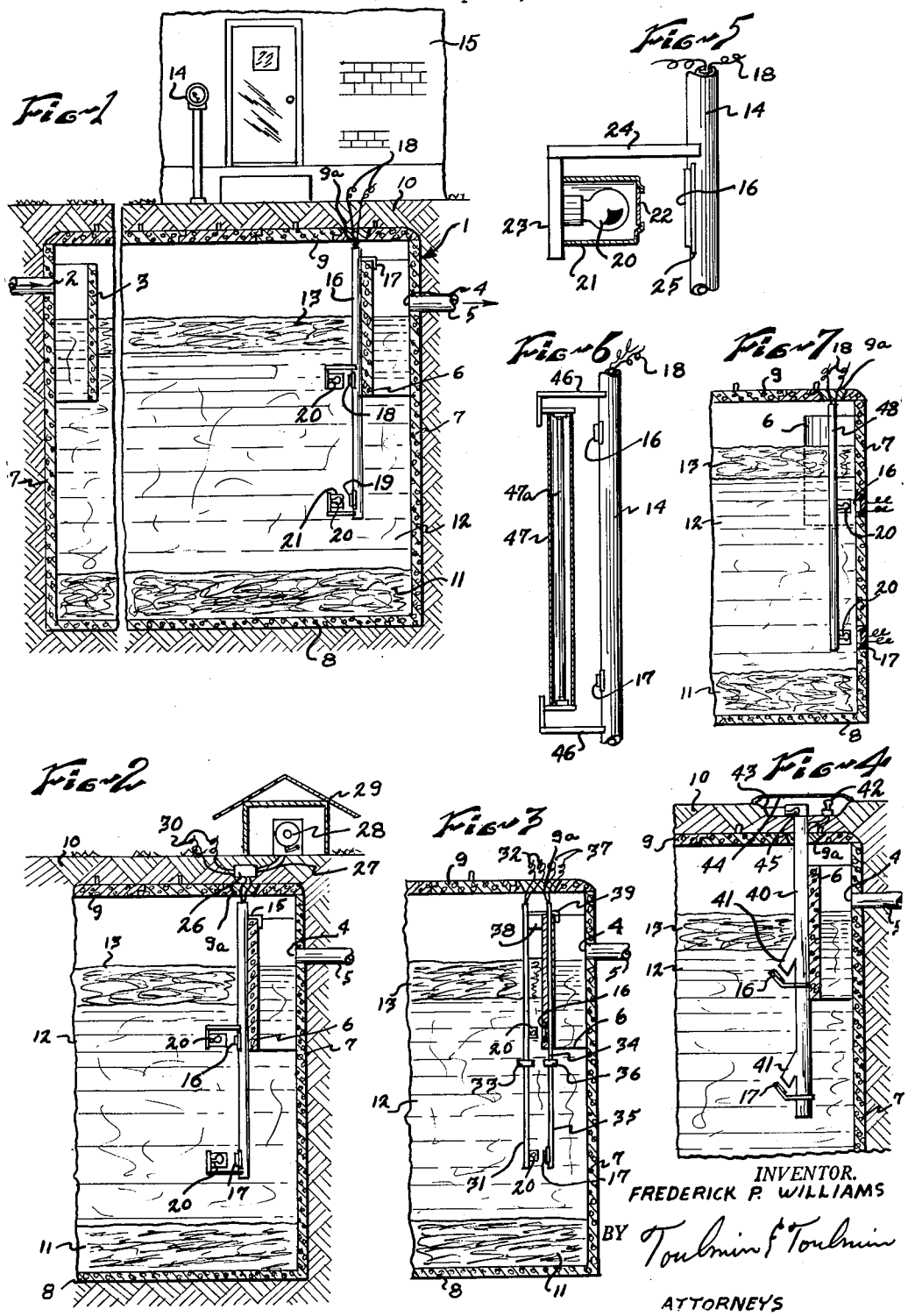

3,025,962
PROTECTIVE DEVICES FOR SEPTIC TANKS
Frederick P. Williams, Dayton, Ohio, assignor to Sanitary Plastics, Inc., Dayton, Ohio, a corporation of Delaware
Filed Sept. 2, 1958, Ser. No. 758,413
6 Claims. (Cl. 210—86)

The present invention relates to underground tanks which are used for treating sewage in various ways in order to eliminate odor and putrefaction.

The septic treatment usually consists of permitting the sewage to remain in the tank for a sufficient length of time to allow the solid matter to precipitate as a sludge by bacteria or chemical action and during this process, a bubble or scum-like layer usually appears at the top of the liquid. The rate at which the scum layer and the sludge precipitate are formed depends upon the character of the sewage, the septic efficiency of the tank, and the length of time between tank cleanings.

The scum and sludge build up continuously even though usually at different rates, and the sludge may attain a depth of several feet or more. After the sludge is allowed to accumulate above a predetermined level, as when the cleaning operation is delayed, its height may reach the level of the outgoing pipe so that a portion of the solid matter, as well as the free liquid, would flow out of the tank and irreparably pollute the leaching bed.

Thus, unless a specified clean-out schedule is maintained and which schedule is usually of greater frequency than is actually necessary, the user of the tank will not become aware of the condition of the contents until odors arise from the leaching bed, indicating a complete collapse of the tank facility.

Likewise, the floating scum layer becomes thicker over a period of time and if it goes beyond a permissible height or thickness, portions may reach downward as far as the outlet and pass on to the leaching bed. This, again, would cause pollution of the bed.

It is impossible to determine the depth of the scum or the sludge by merely opening the top of the tank and peering down, because both formations are opaque, or substantially so, and therefore their extent in depth or height does not lend itself to visual ascertainment.

The primary object of the invention is to provide a device or mechanism for protecting a septic tank from excessive sludge precipitation and/or scum formation and without the necessity for opening the tank from the top.

Another object is to provide a device for mechanism for sounding or showing a warning when the sludge and/or the scum have reached the thickness or height limit beyond which portions might be swept through to the outgoing line.

Still another object is to provide an impulse method and apparatus for automatically indicating when a septic tank is in need of cleaning on account of the presence of excessive amounts of the sludge and/or scum.

The above objects are attained in brief by presenting the sludge and scum areas simultaneously to exploration lights which operate in connection with light-sensitive devices and when the energizing light reaching one or both of these devices is cut off, due to the opacity of the scum and sludge layers, an alarm or other indicating device is caused to sound and preparation can then be made to clean out the septic tank.

Other objects and features will be apparent as the specification is perused in connection with the accompanying drawings, in which:

FIGURE 1 is a diagrammatic view of a septic tank installation improved in accordance with my invention, together with an alarm system which operates automatically when and if dangerous accumulations of solid and scum material are contained in the tank;

FIGURE 2 shows a modified system in which the emergency element is located on the ground directly over the tank;

FIGURES 3 and 4 illustrate some of the forms that the indicator may take in accordance with my invention;

FIGURE 5 represents an enlarged diagrammatic view of the light source and selenium cell structure shown at two positions in FIGURE 1; while FIGURES 6 and 7 illustrate still additional forms of the improved device.

Referring to FIGURE 1, reference character 1 designates a septic tank of any shape, but preferably approximately twice as long as wide and made out of concrete or plastic material, The tank has an inlet opening 2 which may be connected through the toilet facilities of the dwelling and there is a baffle 3 of any well-known type positioned within the tank and directly in front of the opening 2 to direct the sewage downwardly upon entering the tank.

At the other end of the tank there is an outgoing or effluent opening 4 connected to a pipe 5 leading to a leaching bed (not shown) of any suitable design. A baffle 6 of any well known type is positioned in front of the opening 4, the baffle extending above the opening and also considerably below the opening, so as to prevent the sewage from taking a short cut, direct flow from the main portion of the tank into the opening 4.

Thus, the sewage upon passing the inlet opening 2, is forced to flow downwardly at least as far as the lower edge of the inlet baffle 3 and, in order to reach the outgoing opening 4, it must flow downwardly in order to clear the lower edge of the baffle 6. Both baffles completely close off the inlet and outlet openings except for the bottom channels.

The baffle is usually constituted of concrete in the event that the sides of the tank are molded out of concrete, and each baffle is provided at the top with a pair of ears or lips which extend outwardly from the baffle and are received by pockets or openings left in the walls of the tank. Thus, the baffles are usually inserted in the tank after the latter has been installed and are usually removable from the tank since their sole support is by means of the ears hanging from the pockets or recesses provided in the tank.

The sides of the tank are indicated by reference character 7 and the bottom of the tank which may be integrally molded with the tank is indicated at 8. The top 9 of the tank is usually constituted of a number of removable self-supporting slabs which are held in place by a heavy layer of ground 10. Thus, the tank when in use is completely sealed and its function is to collect and temporarily store the sewage that enters through the service pipe at the opening 2.

After a predetermined time to allow for septic action, the fairly transparent liquid called supernatant fluid from which substantially all solid matter has been removed is caused to flow outwardly past the lower edge of the baffle 6 through the opening 4 into the pipe 5, and thence to a leaching bed (not shown) of any suitable and well known type.

After the sewage has remained in the tank for an appreciable time, it tends to settle into strata of material each having different densities and degrees of flowability and, in general, the solid matter 11 termed "sludge" is precipitated to the bottom of the tank, leaving directly above a body 12 of fairly transparent liquid and other material 13 of a lighter character which is floated to the top to form a scum.

As the digestive or septic action of the tank proceeds, the incoming sewage is caused to divide, generally speaking, into three groups of material of which two, the precipitated sludge and the floating scum, tend to build up continuously at a rate depending upon the character of the sewage, also the septic efficiency of the tank (relative dimensions, etc.) and the time during which the sludge has been allowed to remain in the tank. Thus, the thickness of the scum, the clarity of the supernatant fluid and the depth of the sludge, in general, give a broad indication of the digestive and physical efficiency of the tank assuming, of course, ordinary usage and regular cleaning according to the manufacturer's schedule.

Heretofore it has been the practice of many users of the tanks to delay cleaning as long as possible as it is not a pleasant job and many times the delay has been so excessive that the sludge level has reached the lower edge of the outgoing baffle 6 and on occasion the scum 13 has been allowed to collect to such a height that it presses against the top 9 and portions of the sludge and/or scum might find access to the outlet opening 4 by getting past the baffle 6 and thus reach the leaching bed.

In order to avoid the possibility of allowing the scum and sludge to accumulate in an excessive amount as would destroy the septic action of the tank, users of the tank might even resort to a premature schedule of cleaning the tank which, of itself, is not only costly but is a disagreeable job and the frequency of cleaning might be wholly unnecessary, thus adding to the cost of maintenance.

In accordance with the principles of my invention, I have provided an improved method and apparatus for carrying out that method by which an alarm is initiated when the thickness of the sludge at the bottom of the tank and the height of the scum at the top of the tank have reached predetermined amounts that would indicate that a cleaning of the septic tank was imperative in order to prevent any material from reaching the leaching bed other than the fairly clear supernatant fluid which has been thoroughly exposed to the septic action of the tank.

As shown in FIGURE 1, I have provided a hollow pipe 14, preferably of plastic or other suitable insulating material, which has a hook 15 at the top end suitable to embrace the upper edge of the removable baffle 6. The pipe extends for a considerable distance down the tank, using the baffle for a support, and at a position just above the lower edge of the baffle there is provided a selenium cell 16 of the photo-voltaic type, i.e. one that generates current upon being subjected to light, and at the lower end of the pipe there is also another cell 17 of the same type as cell 16. These cells are secured to the pipe 14 in any suitable manner and, as illustrated, are shown as being molded in the pipe.

Wires 18 are taken from each cell, passing up through the interior of the pipe 14, and the cells are preferably connected in series. The wires 18 extend up through the ground layer 10 and are connected by cable to an instrument 19 which responds to electric impulses and may be located inside the home of the user. This instrument may be in the form of a milliammeter or an enunciator or a relay, depending on the wishes of the user.

Directly opposite each of the selenium cells 16, 17 there is a source of light constituted of an electric lamp 20 contained within a waterproof casing 21 (see FIGURE 5) having a glass window 22. The casing 21 may be of stainless steel, highly polished, or plated on the inside, so as to intensify the light and the latter is caused to propagate through the window 22 and normally strike the selenium cell 16 or 17. The lamp 20 is screwed into a bracket 23 which may be supported from an overhang member 24 secured in any suitable manner to the vertical pipe 14.

The wires for energizing the light source 20 may be embedded in the bracket 23 and the support member 24 and carried through the pipe 14 to a suitable source of electricity (not shown). The positions of the lights 20 and their respective selenium cells 16, 17 are predetermined, the upper light and selenium cell pair representing the maximum depth which the scum layer 13 will be permitted to reach, while the light source-selenium cell 17 pair represents the uppermost limit that the sludge body 11 will be permitted to reach.

It will be understood that these limiting levels are set at conservative levels, depending upon the nature of the tank and the character of the sewage to forestall any movement of the scum or of the sludge into a position that might cause either or both to reach the outgoing line 4.

The light-sensitive cells 16, 17 are readily procurable on the market and, as is well understood, they are capable of generating a minute but measurable current when activated by light of a practical intensity. As shown in FIGthe latter is secured to, or preferably molded into, the material of the pipe 4.

The arrangement is such that each pair of light and selenium cell which are permanently spaced apart by their position on the rod 14, can be raised or lowered for inspection by simply moving one or more of the slabs 9 and then pulling the rod 14 upwardly to disengage the hook 15. The same procedure can be followed when necessary to replace either one of the lamps 20. It should be added that the pipe 14 and its supporting hook 15, together with the two pairs of light-selenium indicators, can be made, sold and shipped separate from the tank and used as an accessory to the tank.

In practice, as long as the super-natant fluid 12 surrounds and fills the space between each of the lamps 20 and its selenium cell 16, 17 so that current is generated by each cell, the indicator 19 will show a state of being energized which means that the depth of the scum and that height of the sludge are not excessive. However, if the scum 13 was first to fill up the space at the top of the tank due to excessive septic action or peculiarities of the sewage, and then proceed to force the lower edge of the scum layer downwardly until it reaches the position of the upper light-cell pair, the opaque character of the scum would prevent any light from reaching the cell 16, in which case the indicator 19 will have shown the absence of the normally flowing electric current.

This indicator might be in the form of a bell, buzzer or red light, operated on the basis of absence, rather than the presence, of current, as will be understood by those skilled in the art. The user, upon having his attention called to this situation, would immediately dig up the ground 10 at a position directly above the baffle, then remove one or more of the slabs 9 or the plug 9a and examine the contents of the tank with a view to ordering a cleaning job. He might at the same time, also pull the pipe upwardly to examine the condition of the lights 20 to make sure that both were in good working order, thus assuring himself of the fact that it was the interruption of the light by the excessive thickness of scum, rather than the failure of the light source, that had caused the alarm to be shown or sounded.

Likewise, if the sludge level were to reach upwardly and the heavy opaque material were to surround the space between the lower light source 20 and the cell 17, the latter again would be deactivated and the absence of current would be indicated at 19.

The cells 16 and 17 are preferably connected in series so that the failure of either one would be sufficient to cause proper indications to be made at the device 19 and to that extent protection is made doubly sure because an excessive amount of scum or an excessive thickness of sludge are reasons that demand an immediate cleaning of the septic tank before the leaching bed is irreparably polluted.

On rare occasions the baffle 6 might for some reason or other fall in the tank, perhaps due to fracture of the ears or lips supporting the same, or for any other reason, in which case the pipe 14 which derives its support solely from the baffle, would likewise drop into the tank carrying with it particularly the lower light and selenium cell pair which would become embedded in the sludge to render the selenium cell 17 inactive and thus set the alarm at 19.

While I have shown the pipe 14 and the lamp-cell appurtenances as being applied to the outgoing baffle, it is understood that if desired a device or installation of this type can be used at the incoming baffle 3, although it is preferable to position the same at the outgoing baffle in order to protect the treated fluid as it leaves the tank.

FIGURE 2 shows an installation which is similar to that described in connection with FIGURE 1 except that the wires for energizing the lamps and the wires leading from the selenium cells all taken up through the tube 14, pass into a junction box 26 either above ground or contained within the ground directly above the tank.

Wires 27 may be taken from the junction box 26 and a bell or buzzer 28 contained in a waterproof housing 29 may be employed as an alarm device. Wires 30 from the junction box can be taken to any convenient supply of electricity.

FIGURE 3 shows a different arrangement for parts that the improved installation may take. In this figure the lamps 20 may be supported from an independent hollow tube 31 with wires 32 for the lamps carried upwardly through the rod to any source of electricity. As shown, the rod 31 may be formed of two parts joined together by a nut 33 to facilitate transportation. The rod 34 carrying the selenium cells may be embedded in the baffle 6 for support purposes and there is an extension 35 carrying the lower selenium cell and connected to the embedded rod portion 34 by means of a nut 36. Wires 37 connecting the selenium cells in series may be taken up through the rod portions 35, 34 and connected to any suitable alarm or visually responsive system.

The rod 31 may be rigidly held in position by means of a spacer 38 secured in any suitable manner and preferably located above the normal level of the scum. In addition, a hook-like support 39 may span the two rods 31, 34 and adapted to be hooked over the baffle 6 in order to support the installation in the vertical direction.

FIGURE 4 shows still another form in which the presence of excessive scum and/or sludge can be automatically detected and an alarm given. In this figure the support rod 40 may be constituted of a light-transmitting material such as Lucite or other well known plastic, and downwardly and angularly extending extensions 41 may merge with the rod 40 at predetermined positions.

Directly below and in line with the angular axis of these extensions 41 there is a pair of selenium or photo-voltaic cells 16, 17 and wires connecting these cells in series may be embedded in the rod 40 and carried upwardly to an alarm or indicating system typified as a red light 42. The latter is preferably contained in a waterproof enclosure 43 sunk in the ground directly above the rod, and provided with a glass or plastic window 44.

A source of light 45 contained within a protective shield having a downwardly positioned window may be employed to initiate and propagate light along the Lucite rod 40 and this light reaches down and passes through the branch-like extensions 41 to activate the cells 16, 17. The rod 40 is supported in any suitable manner from the top enclosure 43 so that suitable provision can be made in this enclosure member by which the rod and the selenium cells can be withdrawn upwardly (assuming that a top slab 9 or the plug 9a has been lifted) in order to inspect or to replace the light-responsive devices. The rod 40 may be so positioned that it will bear against the baffle 6 and thus be rigidly held in position, both in the vertical and the horizontal directions.

FIGURE 6 shows a modification in which the selenium cells 16, 17 are embedded or molded in the rod 14 and supports 46 are taken out transversely from the rod to carry between them a glass casing 47 which encloses a neon tube 47a to which energizing wires can be connected through the supports. It will be understood in this connection that the interruption of the circuit which passes through the photo-voltaic cells 16, 17 is brought about solely by the interruption of the light that reaches the cells so that the extent of the lighted area produced by neon tubes can have no effect upon the operation of the cells.

In FIGURE 7 the lamps 20 are carried on a hollow rod 48 and the latter is secured in any suitable manner to the baffle at a position so as to project light against one end of the tank. Within the tank at predetermined distances below the outlet opening 4 there is a pair of selenium or photo-voltaic cells 16, 17 molded into the wall of the tank, these cells being connected preferably in series and connected to a suitable form of alarm, the latter being located either directly in the vicinity of the tank above ground or connections taken to the home of the user of the tank, as explained hereinbefore. Thus, in FIGURE 7 the rod 48 being attached to the baffle 6, can be inserted and removed with the latter when installing or inspecting the condition of the lamps.

From the foregoing, it is evident that I have devised an improved system and combination of elements including lamps and a pair of photo-voltaic cells which are so positioned and supported within the tank that when the thickness or height of the scum and also the amount of sludge collected on the bottom of the tank become excessive and demands a thorough cleaning of the tank, an alarm is given before expensive and irreparable pollution of the leaching bed is caused. Furthermore, should any other abnormal condition arise within the tank, such as the dropping of the baffle or any considerable part of the baffle as would displace the lights or the selenium cells, the same alarm is sounded so that the user can then inspect the tank and ascertain the nature of the damage.

It is evident that the unitary structures for carrying both the lamps and the selenium cells and which may detachably hook over the baffle such as illustrated in FIGURES 1 and 2, are adapted to be sold as a unit apart from the tank itself. Units of this character can be readily transported over distances and applied by the ordinary user, together with a suitable alarm system, to an existing septic tank.

It will be understood that various modifications and arrangements in structure could be made without departing from the spirit of my invention and, accordingly, I desire to comprehend such modifications and substitutions of equivalents as may be considered to come within the scope of the appended claims.

Having thus fully described my invention, what I claim as new and desire to secure by Letters Patent is:

1. In combination, a septic tank having inlet and outlet openings, a baffle positioned adjacent said outlet opening, and means for simultaneously determining when the sludge in the tank has exceeded a predetermined level and for indicating when the baffle has been dislodged from its proper position in the tank, said means comprising a light-sensitive device and a cooperating light source, at least one of which is secured to the baffle, and means cooperating with said light-sensitive device for indicating both when the sludge has exceeded the safe level and when the baffle has moved from its proper position with respect to the outlet opening, whichever has happened first.

2. In combination, a septic tank having inlet and outlet openings, a baffle positioned adjacent said outlet opening, and means for simultaneously determining when the sludge in the tank has exceeded a predetermined level and for indicating when the baffle has been dislodged from its proper position in the tank, said means comprising a light-sensitive device and a cooperating light source, at least one of which is secured to the baffle, and means cooperating with said light-sensitive device for indicating both when the sludge has exceeded the predetermined level and when the baffle has moved from its proper position with respect to the outlet opening, whichever has happened first, said last-mentioned means comprising an electrically responsive device positioned exterior of the tank and connected to said light-sensitive device.

3. In combination, a septic tank having inlet and outlet openings, a baffle positioned adjacent said outlet opening, and means for simultaneously determining when the sludge in the tank has exceeded a predetermined level and for indicating when the baffle has been dislodged from its proper position in the tank, said means comprising a photo-voltaic cell and a cooperating light-source, one of which is secured to the baffle, and means cooperating with said photo-voltaic cell for indicating both when the sludge has exceeded a predetermined level and when the baffle has moved from its proper position with respect to said outlet opening, whichever has happened first, said last-mentioned means including an electrically operated signal device which responds to the lack of electromotive force generated by said photo-voltaic cell and positioned exterior of the tank.

4. In combination, a septic tank having inlet and outlet openings, a baffle positioned adjacent said outlet opening, and means for simultaneously determining when the sludge in the tank has exceeded a predetermined level and for indicating when the baffle has been dislodged from its proper position in the tank, said means comprising a photo-voltaic cell and cooperating light-source, said cell being secured to said baffle, means for transmitting light from said source to said photo-voltaic cell from a position exterior of the tank, and means responsive to the lack of electromotive force generated by said cell upon failure of light to reach the cell for indicating both when the sludge has exceeded the safe level and when the baffle has moved from its proper position with respect to said outlet opening, whichever has happened first.

5. In combination, a septic tank having inlet and outlet openings, a baffle positioned adjacent said outlet opening to prevent sludge from passing unimpeded through said opening, and means for indicating when the baffle has dropped from its proper position with respect to said opening and thus allow sludge to pass freely through said opening, said means including a light-sensitive device and a cooperating light source, at least one of said device and source being secured to said baffle, and means located exterior of the tank for indicating when the baffle has become displaced in position and has intercepted the light from said source.

6. In combination, a septic tank having inlet and outlet openings, a baffle positioned adjacent said outlet opening to prevent sludge from passing unimpeded through said opening, and means for indicating when the baffle has dropped from its proper position, said means including a light-sensitive device and a light source, at least one of said device and source being secured to said baffle, and an electrical means responsive to the failure of light reaching said light-sensitive device for indicating when the baffle has dropped and has intercepted the light from said source.

References Cited in the file of this patent
UNITED STATES PATENTS

| | | |
|---|---|---|
| 1,958,252 | Singleton et al. | May 8, 1934 |
| 1,984,777 | Thomas | Dec. 18, 1934 |
| 2,147,422 | Bendz | Feb. 14, 1939 |
| 2,245,124 | Bonn | June 10, 1941 |
| 2,279,813 | Bent | Apr. 14, 1942 |
| 2,299,529 | Crampton | Oct. 20, 1942 |
| 2,365,221 | Shafor | Dec. 19, 1944 |